US010901857B1

(12) United States Patent
Chopra et al.

(10) Patent No.: US 10,901,857 B1
(45) Date of Patent: Jan. 26, 2021

(54) APPLICATION INTELLIGENCE WITH VIRTUAL VOLUME DATA PROTECTION

(71) Applicant: EMC IP Holding Company LLC, Hopkinton, MA (US)

(72) Inventors: Shelesh Chopra, Bangalore (IN); Samad Mohammed, Bangalore (IN); Vladimir Mandic, San Jose, CA (US); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 682 days.

(21) Appl. No.: 15/498,365

(22) Filed: Apr. 26, 2017

(51) Int. Cl.
*G06F 12/00* (2006.01)
*G06F 11/14* (2006.01)
*G06F 3/06* (2006.01)
*G06F 9/455* (2018.01)

(52) U.S. Cl.
CPC .......... *G06F 11/1461* (2013.01); *G06F 3/065* (2013.01); *G06F 3/0619* (2013.01); *G06F 3/0665* (2013.01); *G06F 3/0683* (2013.01); *G06F 9/45504* (2013.01); *G06F 2201/815* (2013.01)

(58) Field of Classification Search
CPC ...... G06F 3/065; G06F 3/0619; G06F 3/0665; G06F 3/067
See application file for complete search history.

(56) References Cited

U.S. PATENT DOCUMENTS 7,640,454 B1 * 12/2009 Botes ................. G06F 11/1438
714/19
8,260,750 B1    9/2012 Gugick
8,566,542 B1 * 10/2013 Wang ................. G06F 11/1456
711/114

\* cited by examiner

*Primary Examiner* — Gurtej Bansal
(74) *Attorney, Agent, or Firm* — Staniford Tomita LLP (57) ABSTRACT

Stored in an application database is information about a set of applications. The information includes a name, version, and backup policy for the application. The backup policy specifies a backup frequency. A storage array is accessed in which a virtual volume of a virtual machine has been provisioned. There is an attempt to gather from the storage array details about an application on the virtual volume. Upon gathering the details, the application database is consulted to select a backup policy corresponding to the gathered name and version of the application. The virtual volume is backed up according to a particular backup frequency as specified in the selected backup policy.

15 Claims, 6 Drawing Sheets

APPLICATION INTELLIGENCE WITH VIRTUAL VOLUME DATA PROTECTION

CROSS-REFERENCE TO RELATED APPLICATIONS

This application is related to co-pending U.S. patent application Ser. No. 15/498,355, filed Apr. 26, 2017, entitled "Serverless Backup for Virtual Volumes," which is incorporated by reference herein in its entirety.

TECHNICAL FIELD

Embodiments are generally directed to networked-based data backup methods, and more specifically to selecting an appropriate backup policy for a virtual volume.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Organizations depend on having ready access to their applications and other data. Data, however, can be lost in a variety of ways such as through accidental deletion, data corruption, disasters and catastrophes (e.g., fires or flooding), media failures (e.g., disk crash), computer viruses, and so forth. Thus, many organizations make backups of their applications and other data for the purpose of being able to restore them in case of data loss.

Backups, however, can be disruptive especially in a production environment because the production host must divert computing resources such as processing, memory, and so forth to service requests from the backup application. For example, an e-commerce application or other application or website may experience a degradation or lag in performance and responsiveness when the production hosts of the website are busy processing requests from a backup application during a backup operation. Backups may occur more or less often than desired and backups may sweep up more data than is required. There is a need to provide backup frequencies that can change over time depending upon various factors and to provide backups on a more granular level—while also minimizing or reducing disruption to the application host computers.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of Dell EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, a computer-readable medium, or a non-transitory computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. A "non-transitory storage medium" or "non-transitory computer-readable storage medium" may include any media that can contain, store, or maintain programs, information, and data. Examples include physical media such as, for example, electronic, magnetic, optical, electromagnetic, or semiconductor media. More specific examples of non-transitory storage medium or non-transitory computer-readable storage medium include a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for intelligently selecting an appropriate backup policy for a virtual volume (VVOL) of a virtual machine (VM) while reducing disruption to a host computer hosting the virtual machine, a virtual machine management center managing the virtual machine, or both. In an embodiment, there is a backup application that is used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
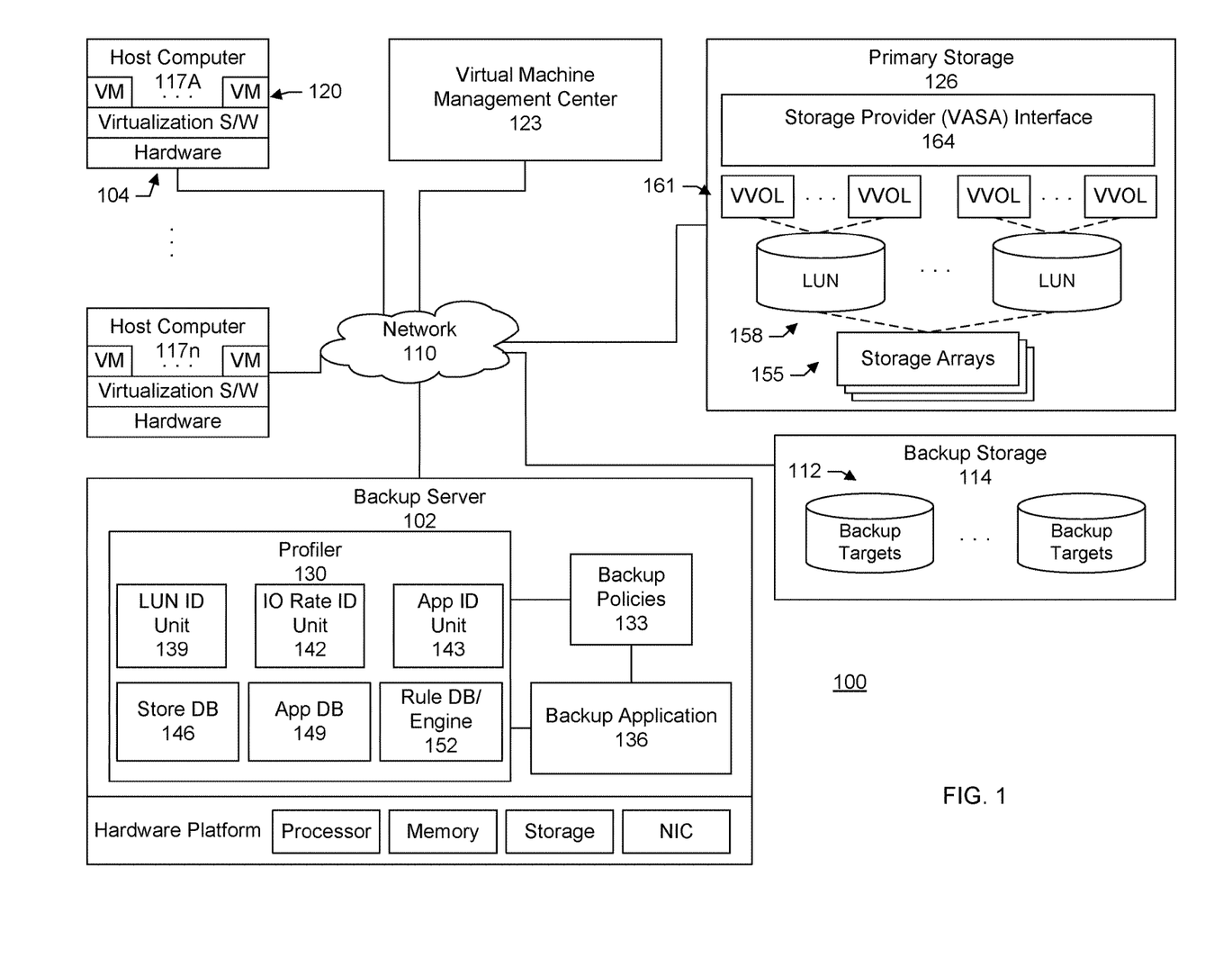
FIG. 1 is a diagram of a large-scale network implementing a system for selecting a backup policy for a virtual volume, under some embodiments.

FIG. 1 illustrates a computer network system 100 that implements one or more embodiments of a system for intelligently selecting an appropriate backup policy for a virtual volume. In system 100, a number of clients 104 are provided to serve as backup clients, hosts, or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in backup media or targets 112 of a backup storage node 114. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, the backup clients may include any number of host computers 117A-N which host any number of virtual machines 120. The virtual machines are managed by a virtual machine management center 123. The virtual machine management center provides a central location to access statistical information about the resource use of each virtual machine, provision resources such as scaling and adjusting the compute, memory, storage and other resources for the virtual machines, and other management functions. Storage for the virtual machines including, for example, applications executed by the virtual machines, data generated by the virtual machines, and so forth is provided by a primary storage system 126.

The backup server may include a general purpose computer with software and hardware such as a processor, memory, storage, network interface card (NIC), and so forth. In an embodiment, the backup server includes a profiler 130, a set of backup policies 133, and a backup application 136. The profiler may include various modules including a logical unit number (LUN) ID unit 139, IO rate ID unit 142, application ID unit 143, store database 146, application database 149, and rule database or engine 152. It should be appreciated that the blocks shown in FIG. 1 can be functional rather than structural. There can be many different configurations that can perform the illustrated functions.

The primary storage may include any number of storage arrays 155. A storage array is a data storage system that may be used for block-based, file-based, or object storage. A storage array may include any number of hard disk drives, solid-state drives, or both (e.g., hybrid array). A storage array may be referred to as a disk array or flash array. Logical unit numbers (LUNs) 158 provide logical abstractions for a physical storage array. A LUN may refer to an entire physical disk, array, portion of a disk, or portion of an array.

In an embodiment, virtual volumes (VVOLs) 161 function as containers for the virtual machines. Each VVOL may address a component of a virtual machine or a data type of a virtual machine, such as a virtual machine configuration file, virtual machine swap file, virtual machine logs, virtual machine metadata, or virtual machine disk (VMDK). Some specific examples of virtual volumes include a configuration volume that contains metadata about a virtual machine (e.g., .vmx files, descriptor files, and log files); a data volume that corresponds to a virtual disk (e.g., VMDK); a swap virtual volume that contains a virtual machine swap file and that may be created when a virtual machine is powered on; clone/snapshot volumes that corresponds to a snapshot; and other virtual volumes (e.g., storage array vendors may create their own virtual volumes).

Multiple VVOLs, e.g., two or more VVOLs, together can represent a virtual machine object. That is, each VVOL may be associated with a single particular virtual machine. As shown in the example of FIG. 1, a VVOL may be created from a LUN or a portion of a LUN. A VVOL may be created dynamically. For example, VVOLs may be created when virtual machine operations such as "Create a Virtual Machine", "Power on a Virtual Machine" or "Clone or Snapshot a VM" are performed. The virtual machine management center (e.g., vCenter) associates one or more virtual volumes to a virtual machine. A virtual machine can thus include multiple virtual volumes.

The primary storage includes a storage provider interface 164. The interface can be an application programming interface (API) through which the virtual volumes can be exposed and that allows other programs, applications, and components of the system to interact with the primary storage. In a specific embodiment, the interface includes a vStorage APIs for Storage Awareness (VASA) interface. VASA is a set of application program interfaces (APIs) that enables the virtual machine management center vSphere vCenter as provided by VMware, Inc. of Palo Alto, Calif., to obtain information about the storage arrays. It should be appreciated that while some embodiments are described in conjunction with VMware vSphere vCenter and VMware virtual volumes, aspects and principles of the systems and techniques are applicable to other virtualized computing environments.

The virtual machine management center, virtual machine host computers, or both can be queried to identify and define objects or other data content for the backup server to backup to the backup storage node. Directly querying or probing the virtual machine management center, virtual machine host computers, or both, however, imposes a load on the hosts of the management center and virtual machines. These probes can consume computing cycles, CPU, memory, and so forth of the production hosts. Compute resources of the production hosts may then be diverted from servicing production requests and workloads to coordinating with the backup application.

In a specific embodiment, the backup server bypasses the production hosts of the virtual machine management center, the virtual machine host computers, or both and instead gathers or attempts to gather the information for a backup from the storage arrays. The information is examined and analyzed in order to select an appropriate backup policy. The bypassing of the production hosts for the backup allows the production hosts to remain focused and dedicated to servicing production requests and workloads rather than responding to queries from the backup application.

Server virtualization has proven to be a highly effective technology in many enterprises and is a key element enabling cloud and IT as a Service (ITaaS) offerings. Storage technology has been an area of increased focus as server virtualization has expanded due to the impact server virtualization has on data access patterns of applications. There has also been a consolidation of the roles and responsibilities in larger IT organizations. Many companies have found it more efficient to utilize IT generalists or, more often, hypervisor centric IT administrators. In order to improve the efficiency and effectiveness of the IT generalist, hypervisor management tools are expanding to encompass more of the IT infrastructure.

In an embodiment, virtual volumes such as VMware virtual volumes provide an integration and management framework for external storage (SAN and NAS). This framework allows customers to easily assign and manage storage capabilities on a per-application (per-VM) basis at the hypervisor level using Storage Policy-Based Management (SPBM). The virtual volume storage architecture represents a significant change in the way hypervisors utilize and interact with storage systems. Utilizing a management API known as VASA (vSphere APIs for Storage Awareness), a virtual machine management center such as VMware vSphere6 is able to utilize the unique capabilities of each underlying storage system, as presented through the VASA interface. This enables VM administrators and non-storage IT administrators to have visibility into storage system QoS features, such as RAID levels and drive type, and to leverage the storage systems data protection features including snapshots. With direct VM to device mapping, VVOLs provide fine grain controls for data protection and I/O performance analysis.

Specifically, use of virtual volumes can provide more granularity than LUN-level granularity. For example, one or more LUNs (LUN IDs) or data stores may map to a single host and service-based policies can are applied at the LUN-level. In other words, each guest VM is subject to the same level of service because they sit on a shared volume.

Virtual volumes, however, provide a more granular approach to referencing virtual machines. The storage and data services can be applied on a per VMDK level as opposed to a data store level. The data services provided by the storage vendors can be leveraged rather than relying on the services developed and maintained by the virtualization platform vendors.

Taking VM backups may include probing the virtual machine management center (e.g., Vcenter), VM host computer, or both thereby consuming CPU, memory, and so forth of the production hosts. This may happen iteratively to ensure that important events and data are not missed. This direct interaction is an expensive operation. That is, the operations between the production host and backup server are expensive. CPU and memory of the production host is consumed thereby redirecting critical production resources. Since communication is with servers and not storage, probes can be slow and are dependent upon various dependencies that the operating system (OS) layer will present. Further, backup policies are static and not self-serviceable.

In a specific embodiment, however, systems and techniques are provided to leverage the storage API (e.g., VASA) to facilitate efficiently probing and reporting changes. Systems and techniques are provided to avoid or reduce the probing at the application host level for at least some of the intelligence for backing up a virtual volume. Systems and techniques are provided to directly talk to the storage arrays instead of probing against the application host which consumes CPU and memory of the application host.

In a specific embodiment, the information is obtained by querying the storage array API to see and identify the metadata and changes associated with particular LUN. Using that profile information about the LUNs (LUN IDs) that constitutes a VVOL, the system decides on backup policies, technologies, or both. For example, decisions or determinations may be made as to whether the backup should be as HDFS (High Density Filesystem) or LDFS (Low Density Filesystem) type workloads, backup should be less frequently or backup should be higher frequency. In another specific embodiment, virtual volumes are tagged with backup set definitions or attributes such as "Mission-Critical-VVOL" or "Low-Critical." In this specific embodiment, the type of tag defines the backup frequency, backup targets, or both. In another specific embodiment, a dynamic lookup is performed of one or more applications that are residing in the VVOLs and an intelligent call is made on the backup operation. Once the details of which application is running on that VVOL is obtained, a look-up is performed in an Application-Lookup DB that will decide or help decide the recovery point objectives (RPO) requirements of those applications. In a specific embodiment, these processes and steps are performed without user manual intervention. In a specific embodiment, the user may override these dynamic rules.

Referring back now to FIG. 1, the profiler communicates with or talks to the storage array through an API, such as VASA, to gather various information about a VVOL. Specifically, the LUN ID unit is responsible for collecting the virtual volume to LUN mapping, the IO rate ID unit is responsible for identifying the change rate (I/O rate) of the LUN, and the application ID unit is responsible for identifying what application is running and the version of the application that is running.

The store database stores the information captured by the profiler and stores them in schemas. Table A below shows an example of a schema for a VVOL Map.

TABLE A

| VVOL ID | Array ID | LUN ID | Applications | Application version |
|---|---|---|---|---|
| 111-222-333 | ARRAY_111 | 101<br>201<br>301 | Oracle | 12 |
| 333-444-555 | ARRAY_222 | 444<br>555 | Sybase | 11.5 |
| 333-444-666 | ARRAY_222 | 103<br>203 | Exchange | 2016 |
| 333-444-777 | ARRAY_222 | 103<br>203 | SQL | 2016 |
| 666-777-888 | ARRAY 333 | 666<br>777 | Filesystem | NA |

A first column of the table lists the VVOL ID. A second column lists the storage array ID in which the volume has been provisioned. A third column lists the LUNs (LUN IDs) mapped to the VVOL. A fourth column lists the application on the VVOL. A fourth column lists the version of the application. A virtual volume may be mapped to a single LUN or multiple (e.g., two or more LUNs). Multiple virtual volumes (e.g., two or more) may map to a single LUN.

Table B below shows an example of a schema for the IO rate.

TABLE B

| VVOLID | Array_ID | LUN ID | I/O rate | Timestamp |
|---|---|---|---|---|
| 111-222-333 | Array_111 | 101 | NIL | Mar. 25, 2017, 7:30 AM |
| 111-222-333 | Array_111 | 201 | NIL | Mar. 25, 2017, 7:30 AM |
| 111-222-333 | Array_111 | 301 | 10% | Mar. 25, 2017, 7:30 AM |
| 111-222-333 | Array_111 | 101 | 5% | Mar. 25, 2017, 8:00 AM |
| 111-222-333 | Array_111 | 201 | 7% | Mar. 25, 2017, 8:05 AM |
| 111-222-333 | Array_111 | 301 | 10% | Mar. 25, 2017, 8:05 AM |

A first column of the table lists the VVOL ID. A second column lists the storage array ID in which the volume has been provisioned. A third column lists the LUN mapped to the virtual volume. A fourth column lists the IO rate. The IO rate may indicate the percentage of time a disk is in use by a read or write command. A fifth column records the time and date that the information was collected.

In an embodiment, the store database may form part of a backup server catalog. The backup catalog stores metadata associated with the data from the backups such as information identifying the backup source, time and date of a backup, location of a backup, type of backup, type of data that has been backed, and so forth.

The rule engine or database stores a set of predefined conditions and backup policies. There can be a set of default rules. A user or administrator can then add or customize further such as by adding a new rule specifying a range of IO rates and a backup policy to be applied when an IO rate falls within the range of IO rates. Table C below shows an example of a schema for the rule engine.

TABLE C

| VVOL ID | I/O rate | Backup Policy |
|---|---|---|
| 111-222-333 | <5% | Once a day backup |
| 333-444-555 | >5% < 10% | Backup every four hours |
| 666-777-888 | <10% < 20% | Hourly backups |
| 111-222-333 | >20% | 15 min backups |

A first column of the table lists the VVOL ID. A second column lists a range of IO rates. A range may include a relational operator (e.g., greater than ">"; less than "<"; equal to "="; not equal to "≠"; greater than or equal to "≥"; less than or equal to "≤"), an upper limit value, a lower limit value, or combinations of these. The third column lists the backup policy including backup frequency to be applied to the VVOL when the IO rate falls within the corresponding IO range.

Table D below shows an example an internal application lookup database that cross-references an application and version with a recovery point objective (RPO) or backup policy and backup frequency.

TABLE D

| Application | Application Version | Type of Application | RPO |
|---|---|---|---|
| Oracle | 11 g | Important | Hourly |
| Oracle | 12 c | Mission critical | 15 min |
| SQL | 2008 | Important | Hourly |
| SQL | 2016 | Mission critical | 15 min |
| Sybase | 11 | Regular | Once a day |
| Exchange | 2016 | Mission critical | 15 min |

A first column of the table lists a name of an application. A second column lists a version of the application. A third column identifies an application type. The application type indicates a level of importance of the application to the enterprise. A fourth column lists the recovery point objective (RPO) or backup frequency.

In an embodiment, each VVOL is profiled by the profiler to obtain the application running on these VVOLS and the information may be captured in the backup server catalog. Table E below shows an example of a profiling operation to gather details of applications on the VVOLS.

TABLE E

| VVOL ID | Application | Application version | Type of Application |
|---|---|---|---|
| 111-222-333 | Oracle | 12 | Mission critical |
| 333-444-555 | Sybase | 11.5 | Regular |
| 333-444-666 | Exchange | 2016 | Mission critical |
| 333-444-777 | Important | 2008 | Mission critical |
| 666-777-888 | FS | NA | Regular |

A first column of the table lists the VVOL ID. A second column lists the name of the application that was discovered on the VVOL. A third column lists the version of the application that was discovered. A fourth column stores a tag for the VVOL identifying the level of importance of the application to the enterprise.

Figure 2:
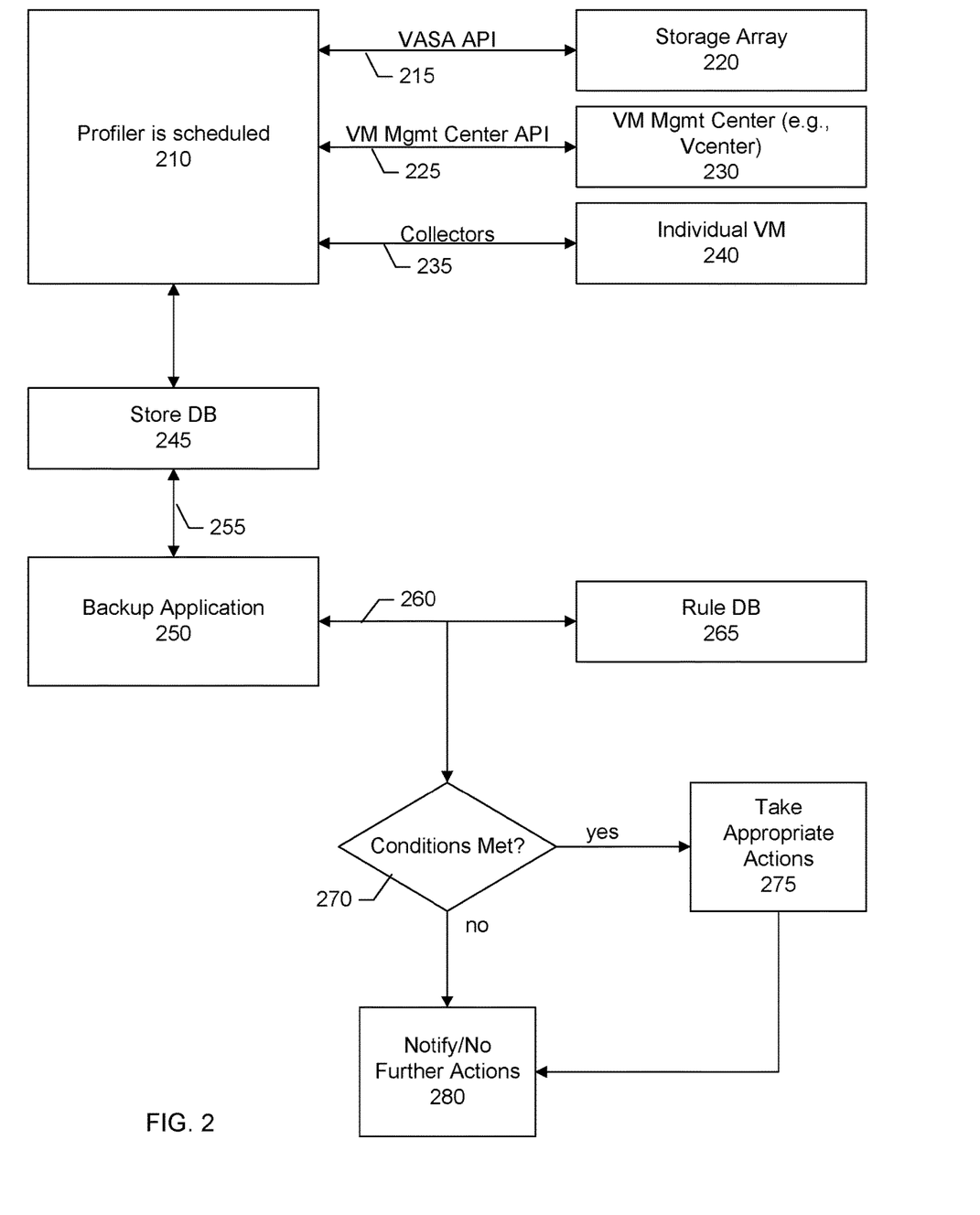
FIG. 2 shows an overall flow for selecting a backup policy for a virtual volume according to a specific embodiment.

FIG. 2 shows an overall flow for selecting a backup policy for a VVOL. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, a profiler is scheduled to gather information about virtual volumes provisioned in a storage array. The system allows an administrative user to create a schedule specifying the times, dates, frequencies, and so forth at which the profiler will gather the information. For example, profiling may be scheduled to be performed once every 15, 30, or 60 minutes; twice a day; once a day; once a week; or at any other schedule as desired.

In a specific embodiment, once profiling is triggered an algorithm is used to gather the VVOL information in a manner that is least disruptive to the virtual machines. More particularly, in a step 215, an initial or first attempt is made to gather the VVOL information from a storage array 220. For example, the profiler may issue a request to the storage array for an identification of the virtual volumes associated with the storage array, LUNs (LUN IDs) mapped to the virtual volumes, IO rate, application on the virtual volume, version of the application, or combinations of these. In a specific embodiment, the profiler accesses the storage array through the VASA API to gather information such as the virtual volume to LUN mapping, change or IO rate of the LUN, name of application on the LUN, version of application on the LUN, or combinations of these.

Depending upon factors such as the provider of the storage array or other factors, the profiler may or may not be able to obtain all the required information from the storage array. For example, the storage array API may not expose some or all of the required VVOL information for the backup. If the initial or first attempt to gather the VVOL information from the storage array fails or is otherwise unsuccessful, a second attempt 225, after the first attempt, is made to gather the VVOL information from a virtual machine management center 230. In a specific embodiment, the virtual machine management center is Vcenter and, in this specific embodiment, the profiler interfaces with the Vcenter API to obtain the VVOL information.

The second attempt to obtain the VVOL information from the virtual machine management center may or may not be successful. For example, depending upon factors such as the specific virtual machine management center vendor, version, or other factors, the profiler may or may not be able to obtain all of the required information from the virtual machine management center. If the second attempt to gather the VVOL information from the virtual machine management center fails or is otherwise unsuccessful, in a step 235, the profiler collects the VVOL information from individual virtual machines 240.

In a specific embodiment, collecting the VVOL information from the virtual machines themselves is performed as a last resort after the attempts to collect the information from the storage array and virtual machine management center are unsuccessful. This procedure helps to reduce the disruption to the production or application hosts.

Once the VVOL information has been obtained, the profiler stores the information in a store database 245. In some cases, the information may be obtained from two or more different sources (e.g., VM management center or individual VM). For example, the profiler may be able to obtain a first piece of information (e.g., virtual volume to LUN mapping) from the storage array, but the storage array API may not expose a second piece of information (e.g., application on the virtual volume). In this case, the profiler may obtain the second piece of information from the VM management center or individual VM.

In a specific embodiment, at a backup time, a backup application 250 accesses 255 the store database to retrieve information about a virtual volume. The information may include a virtual volume to LUN mapping, IO rate of the LUN, application on the LUN, or combinations of these. The backup application can access 260 a rule database 265 to retrieve one or more rules relevant to the backup.

In a step 270, a determination is made as to whether conditions in the one or more rules have been met or satisfied. In a specific embodiment, a rule specifies a VVOL ID of a virtual volume, a corresponding range of IO rates, and a corresponding backup policy including a backup frequency. The rule may be evaluated by comparing the IO rate of the corresponding VVOL that has been collected and stored in the store database against the range of IO rates in the rule.

If the IO rate falls within the range of IO rates, a determination is made that the conditions have been met. The IO rate may be compared against a value specified in the range of IO rates and according to a relational operator specified in the range of IO rates. For example, the range of IO rates may specify an upper limit value and that the conditions are met when the IO rate is less than the upper limit value. As another example, the range of IO rates may specify a lower limit value and that conditions are met when the IO rate is greater than the lower limit value. As another example, the range of IO rates may specify lower and upper limit values and that conditions are met when the IO rate is greater than the lower limit value and less than the upper limit value.

If the conditions are met, in a step 275, appropriate actions are taken. In a specific embodiment, the actions to be taken are specified in the corresponding backup policy for the virtual volume and specify the backup frequency (e.g., once a day backup, backup every four hours, hourly backups, 15 minute backups, and so forth). Once the appropriate actions have been taken, in a step 280, a notification may be generated for the administrator user.

Alternatively, if the conditions have not been met, a notification may likewise be generated for the administrator user and no further actions are taken (step 280).

Figure 3:
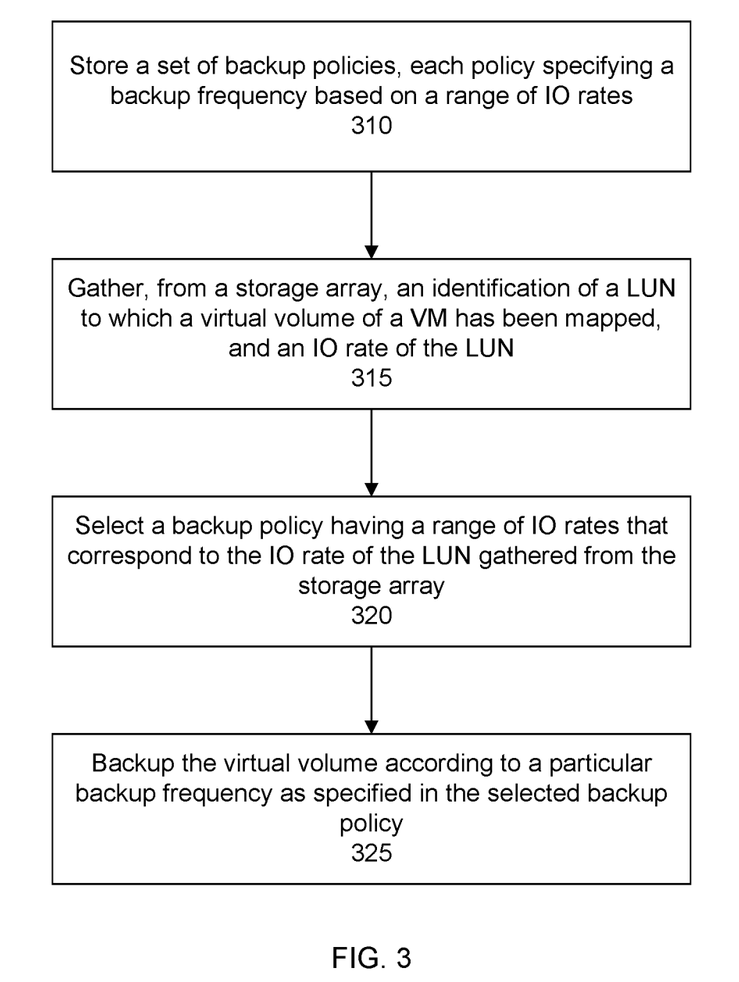
FIG. 3 shows further detail of a flow for selecting a backup policy for a virtual volume based on IO rate according to a specific embodiment.

FIG. 3 shows another flow for selecting an appropriate backup policy based on an IO rate. In a step 310, a set of backup policies are stored. Each policy specifies a backup frequency based on a range of IO rates. A backup frequency can be a value that specifies the number of backups to perform within a particular time period (e.g., backup once a day or once every 24 hours, backup every four hours, backup every hour, backup every 15 minutes, and so forth).

In a step 315, the system or profiler gathers, from a storage array, an identification of a LUN to which a virtual volume of a virtual machine has been mapped and an IO rate of the LUN. In a step 320, a backup policy having a range of IO rates that correspond to the IO rate of the LUN gathered from the storage array is selected. In a step 325, the virtual volume is backed up according to a particular backup frequency as specified in the selected backup policy.

This technique allows for very granular control over the backup frequency of a virtual volume while also reducing disruption to the virtual machine. In a specific embodiment, the backup policy including backup frequency is associated with a range IO rates. The backup frequency can be configured so that it is proportional to the IO rates. That is, high IO utilization due to large numbers of read/write requests can provide for more frequent backups. The backup frequency of a particular virtual volume can vary with time. A virtual volume that reports via the storage array a high IO rate at a particular time or during a particular time period may be backed up more frequently as compared to a different time or time period of the same virtual volume when a low IO rate is reported.

In a specific embodiment, a method includes querying the storage array according to a pre-determined schedule to gather a first current IO rate of the LUN, selecting a first backup policy specifying a first backup frequency based on the first current IO rate of the LUN falling within a first range of IO rates of the first backup policy, backing up the virtual volume according to the first backup frequency as specified in the first backup policy, after the backing up according to the first backup frequency, querying the storage array according to the pre-determined schedule to gather a second current IO rate of the LUN, selecting a second backup policy specifying a second backup frequency based on the second current IO rate of the LUN falling within a second range of IO rates of the second backup policy, and backing up the virtual volume according to the second backup frequency as specified in the second backup policy, where the second backup frequency is different from the first backup frequency, the second range of IO rates is different from the first range of IO rates, and the second current IO of the LUN is different from the first current IO of the LUN.

A backup policy and corresponding backup frequency can be associated with a particular VVOL to allow very fine grained control for data protection. For example, a virtual machine may be associated with multiple VVOLs. Each VVOL may be associated with a particular backup policy having a particular backup frequency that is based on an IO rate or range of IO rates. Thus, in a specific embodiment, rather than backing up an entire virtual machine, backups can be of a specific VVOL of the virtual machine and the backup frequency of the specific VVOL can be based on an IO rate of the specific VVOL.

In various specific embodiments, a virtual machine may be associated with first and second virtual volumes. There can be a first backup policy specifying a first backup frequency for a first range of IO rates. There can be a second backup policy specifying a second backup frequency for a second range of IO rates. The first backup frequency is different from the second backup frequency. The first range of IO rates is different from the second range of IO rates. The first backup policy is associated with the first virtual volume. The second backup policy is associated with the second virtual volume.

One of the first or second virtual volumes may be backed up more or less frequently than another of the first or second virtual volumes based on IO rate. A backup of one of the first or second virtual volumes of the virtual machine may exclude, omit, or not include a backup of another of the first or second virtual volumes. During a backup of one of the first or second virtual volumes, another of the first or second virtual volumes may not be backed up.

Figure 4:
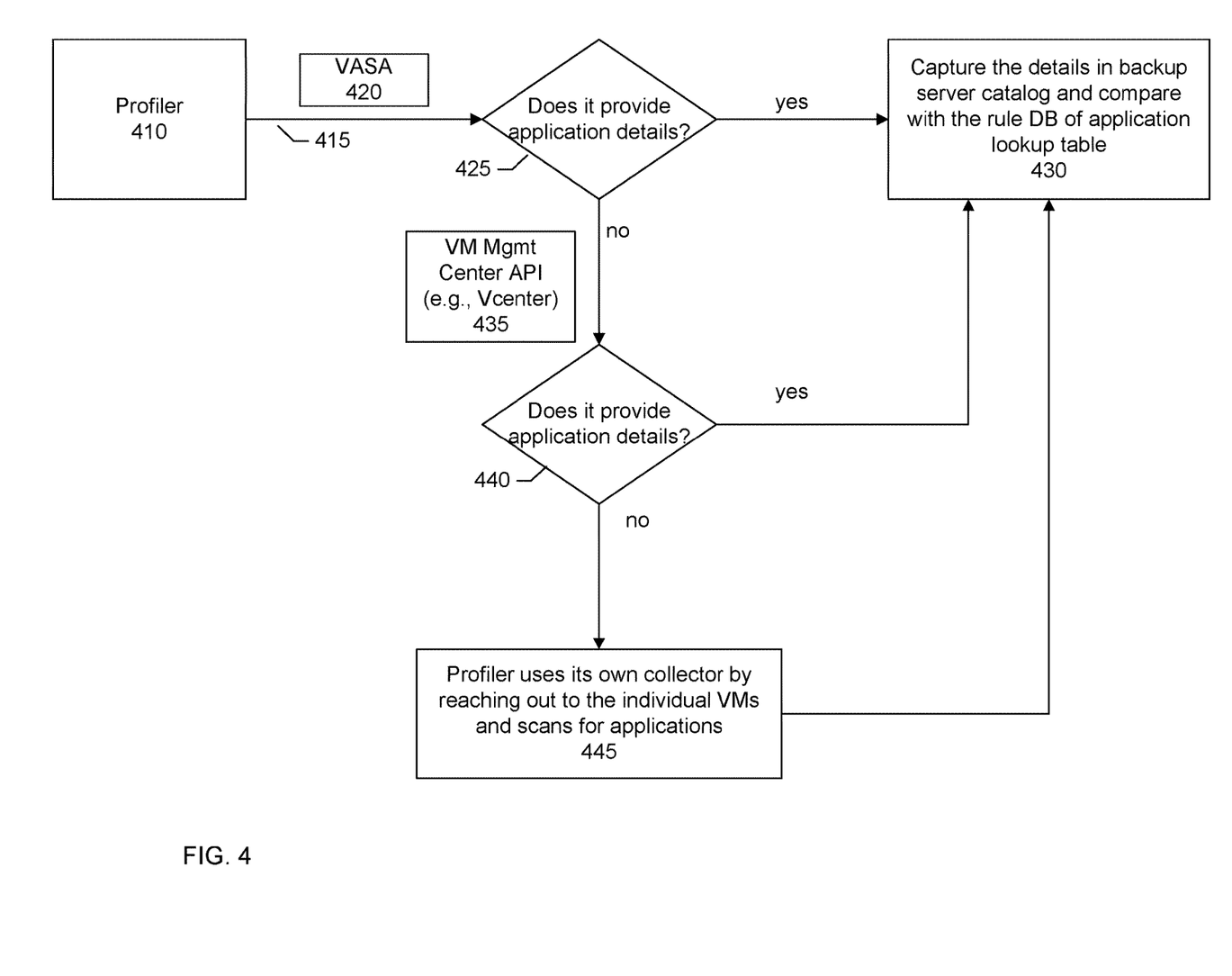
FIG. 4 shows another flow for selecting a backup policy for a virtual volume based on the application on the virtual volume according to a specific embodiment.

FIG. 4 shows a flow for obtaining details of an application on a virtual volume in order to select an appropriate backup policy. As discussed, an algorithm is used to gather the VVOL information in a manner that is least disruptive to the virtual machines. Systems and techniques are provided for an operation that is least expensive to the application host. In a specific embodiment, the exposed API of the storage array, virtual machine management center, or both are leveraged to obtain such information. Specifically, during an initial or first attempt, a profiler 410 accesses 415 a storage array via, for example, a VASA API interface 420 or other suitable interface to request and gather details about an application on a virtual volume. The application details include a name or other identifier of an application on the virtual volume and a version of the application.

In a step 425, a determination is made as to whether the application details were successfully obtained from the storage array. Upon the application details having been obtained, the application detail is captured in the backup server catalog and compared with the rules database of the application lookup table (step 430).

Alternatively, if some or all of the application details were not successfully obtained from the storage array, a second attempt is made to gather the application details by probing the virtual machine management center such as via Vcenter API in the case of a Vcenter VM management center (435). In a step 440, a determination is made as to whether the application details were successfully obtained from the VM management center. If so, the application details, as discussed above, are captured in the backup server catalog and compared with the rules database of the application lookup table (step 430).

Alternatively, if some or all of the application details were not successfully obtained from the VM management center API, the profiler uses its own collector to probe or reach out the individual virtual machines at the host computers and scan for the application details (step 445).

Figure 5:
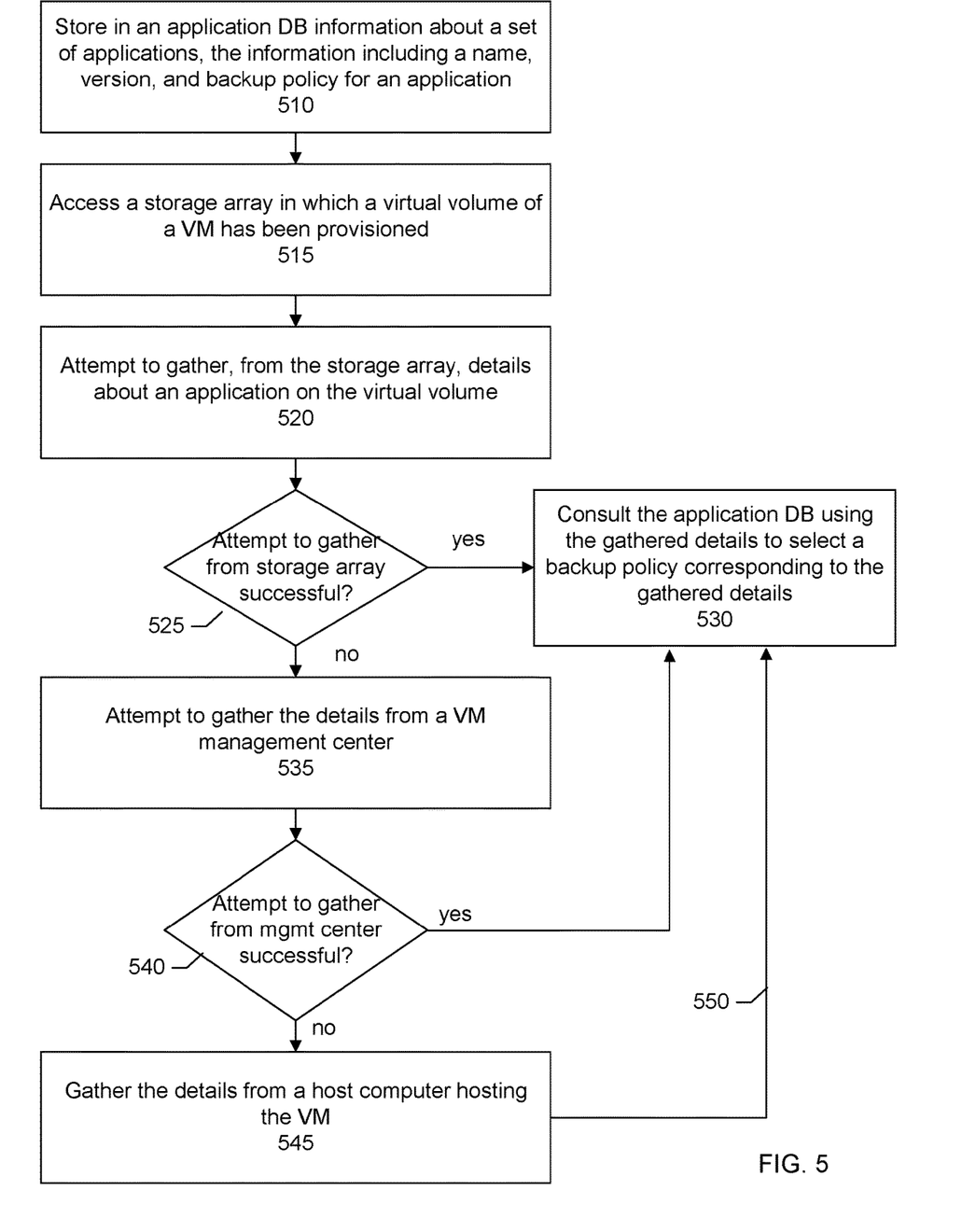
FIG. 5 shows further detail of a flow for selecting a backup policy for a virtual volume based on the application on the virtual volume according to a specific embodiment.

FIG. 5 shows detail of another flow for selecting an appropriate backup policy based on the application on a virtual volume. In a step 510, an application database stores information about a set of applications. The information may include a name of the application, version of the application, and a corresponding backup policy for the application. The backup policy can specify a backup frequency. In a step 515, a storage array is accessed in which a virtual volume of a virtual machine has been provisioned. In a step 520, an attempt is made to gather, from the storage array, details about an application on the virtual volume.

In a step 525, a determination is made as to whether the attempt to gather the application details from the storage array was successful. Upon the application details having been gathered, the application database is consulted using the gathered details to select a backup policy corresponding to the gathered details (step 530).

If the attempt to gather the application details from the storage array is not successful (e.g., error returned), in a step 535, an attempt is made to gather the application details from a virtual machine management center.

In a step 540, a determination is made as to whether the attempt to gather the application details from the virtual machine management center was successful. If the attempt was successful, the process proceeds to consult the application database using the gathered details to select the corresponding backup policy (step 530).

If the attempt to gather the application details from the virtual machine management center is not successful, in a step 545, the application details are gathered by probing the host computer hosting the virtual machine. The process then proceeds 550 to consult the application database using the gathered details to select the corresponding backup policy (step 530).

More particularly, as discussed above, in a specific embodiment, the application database stores information about the applications including a name of an application, version of the application, and backup policy including backup frequency for the application. Selecting the backup policy may include scanning, consulting, cross-referencing, or comparing the application database with the gathered application details to identify that particular backup policy tagged to with the corresponding application name and version. Once the matching backup policy has been identified, the backup of the virtual volume can proceed according to the backup frequency specified in the backup policy.

Very granular control can be applied over what is backed up and the frequency of the backups. For example, an application executing or running on a virtual volume that is particularly critical may be backed up more frequently than another application on another virtual volume identified as a less critical. In a specific embodiment, the backup policy including backup frequency is associated with a particular application. The backup frequencies can be configured so that different applications are backed up at different frequencies.

In various specific embodiments, first and second virtual machines are hosted on a same host computer. The first virtual machine is associated with a first virtual volume. The second virtual machine is associated with a second virtual volume. There can be a first backup policy specifying a first backup frequency for a first application. There can be a second backup policy specifying a second backup frequency for a second application. The second application is different from the first application. The second backup frequency is different from the first backup frequency. A storage array in which the first and second virtual volumes have been provisioned is probed to identify the applications on the first and second virtual volumes. A backup of the first virtual volume can be performed independent of a backup of the second virtual volume.

Consider, as an example, that the first application is on the first virtual volume and the second application is on the second virtual volume. In this example, the first virtual volume is backed up according to the first backup frequency of the first backup policy. The second virtual volume is backed up according to the second backup frequency of the second backup policy. Thus, at a particular time one of the first or second virtual volumes may be backed up while another of the first or second virtual volumes is not backed up.

It should be appreciated that the schemas shown above are merely examples. A schema may include other attributes, attributes different from what has been shown, or both to allow more complex and more granular backups (for example, tracking and acting at each LUN level) or less granular backups as desired. In a specific embodiment, a VVOLID is tagged with a tag identifying the application or type of data on the VVOLID (e.g., Oracle, Sybase, Filesystems) and based on that tagging, rules can be created. The rules can be evaluated to determine the backup frequency of a particular VVOL.

In a specific embodiment, the storage arrays are profiled as part of an initial setup. In this specific embodiment, a method includes storing, in an application database, a name of an application, version of the application, and application type information. The application type information indicates a level of importance or criticality of the application to the enterprise (e.g., important, mission critical, or regular). The method further includes profiling the storage arrays to identify applications on virtual volumes that have been provisioned in the storage arrays. The identification information may include an identifier for a virtual volume, name of an application on the virtual volume, and version of the application.

The profiled information may be stored in a store database or catalog. In this specific embodiment, after the storage arrays have been profiled, the profiled information is compared against the information in the application database to identify the application types on the virtual volumes. The comparing may include matching the application names and versions gathered from the storage arrays with the corresponding application names and versions from the application database. The virtual volumes listed in the catalog may then be tagged with a tag indicating the application type (e.g., important, mission critical, low critical, or regular). In this specific embodiment, a backup application can then access the catalog, review the application type tag of an application on the virtual volume, and backup the virtual volume according to the application type tag. For example, the backup application may include logic specifying that applications of a first type (e.g., mission critical) are to be backed up at a first frequency, while applications of a second type (e.g., important) are to be backed up at a second frequency, different from the first frequency. The application type or type tag can thus define the backup frequency.

In another specific embodiment, the application type tag may instead or additionally define the backup targets. For example, a virtual volume that is tagged with an application type of mission critical may be backed up to a high performance backup target (e.g., solid state drive). Backing up to a high performance device helps to ensure the reliability of the backup and helps to ensure that the backup can be recovered quickly if needed. A virtual volume that is tagged within an application type of low critical may be backed up to a lower performance backup target (e.g., tape) in order to lower operational costs.

In a specific embodiment, once the storage arrays have been profiled, backups can proceed without having to re-profile the storage arrays because the profiled information is saved in the store database or other catalog. The backup application accesses and reviews the profiled information to determine the backup schedule or other backup parameters. In another specific embodiment, the system can be configured, such as by an administrator, to re-profile the storage arrays before beginning a backup. This can be desirable in cases where the specific applications on the virtual volumes are frequently changing. In another specific embodiment, the profiling of the storage arrays may be performed according to a pre-determined schedule or periodically such as once a week to ensure that the information stored in the store database or catalog is up-to-date. In another specific embodiment, the profiling may be performed on-demand.

Figure 6:
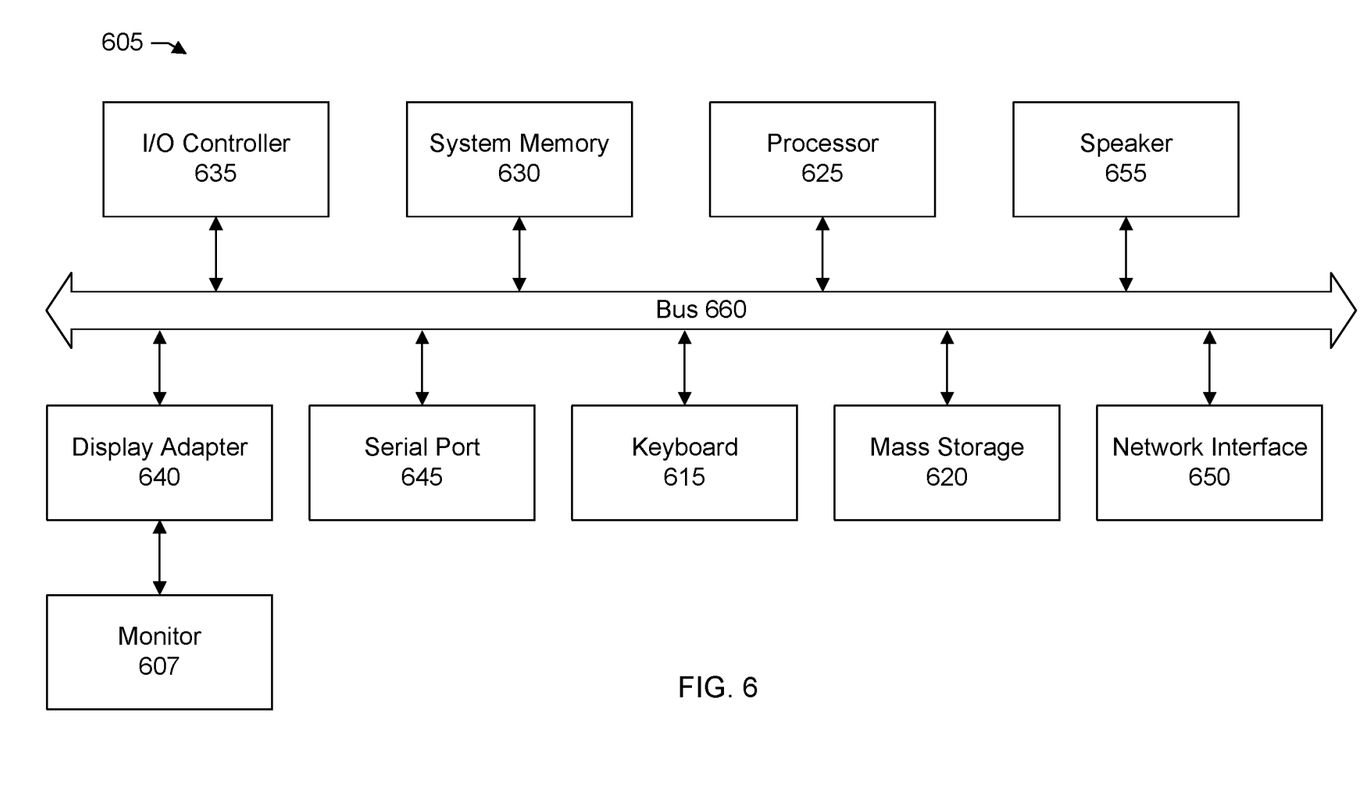
FIG. 6 shows a block diagram of a computer system suitable for use with the system, under some embodiments.

FIG. 6 shows a system block diagram of a computer system 605 used to execute the software of the present system described herein. The computer system includes a monitor 607, keyboard 615, and mass storage devices 620. Computer system 605 further includes subsystems such as central processor 625, system memory 630, input/output (I/O) controller 635, display adapter 640, serial or universal serial bus (USB) port 645, network interface 650, and speaker 655. The system may also be used with computer systems with additional or fewer subsystems. For example, a computer system could include more than one processor 625 (i.e., a multiprocessor system) or a system may include a cache memory.

Arrows such as 660 represent the system bus architecture of computer system 605. However, these arrows are illustrative of any interconnection scheme serving to link the subsystems. For example, speaker 655 could be connected to the other subsystems through a port or have an internal direct connection to central processor 625. The processor may include multiple processors or a multicore processor, which may permit parallel processing of information. Computer system 605 shown in FIG. 6 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method includes storing a plurality of backup policies, each backup policy specifying a backup frequency based on a range of input/output (IO) rates; gathering, from a storage array, an identification of a logical unit number (LUN) to which a virtual volume of a virtual machine has been mapped, and an IO rate of the LUN; selecting a backup policy having a range of IO rates that correspond to the IO rate of the LUN gathered from the storage array; and backing up the virtual volume according to a particular backup frequency as specified in the selected backup policy, the backup policy thereby having been selected without querying a host computer hosting the virtual machine, or a virtual machine management center managing the virtual machine.

The method may include storing a first backup policy specifying a first backup frequency based on a first range of IO rates; and storing a second backup policy specifying a second backup frequency based on a second range of IO rates, wherein the second range of TO rates is higher than the first range of IO rates, and the second backup frequency specifies more frequent backups than the first backup frequency. Selecting a backup policy may include comparing the IO rate of the LUN to a first range of IO rates of a first backup policy specifying a first backup frequency; determining that the IO rate of the LUN falls outside the first range of TO rates; comparing the IO rate of the LUN to a second range of IO rates of a second backup policy specifying a second backup frequency; and determining that the IO rate of the LUN falls within the second range of IO rates, the second backup policy thereby being the selected backup policy, wherein the first range of IO rates of the first backup policy is different from the second range of IO rates of the second backup policy, and the first backup frequency is different from the second backup frequency.

The method may include querying the storage array according to a pre-determined schedule to gather a first current IO rate of the LUN; selecting a first backup policy specifying a first backup frequency based on the first current IO rate of the LUN falling within a first range of IO rates of the first backup policy; backing up the virtual volume according to the first backup frequency as specified in the first backup policy; after the backing up according to the first backup frequency, querying the storage array according to the pre-determined schedule to gather a second current IO rate of the LUN; selecting a second backup policy specifying a second backup frequency based on the second current IO rate of the LUN falling within a second range of IO rates of the second backup policy; and backing up the virtual volume according to the second backup frequency as specified in the second backup policy, wherein the second backup frequency is different from the first backup frequency, the second range of IO rates is different from the first range of IO rates, and the second current IO of the LUN is different from the first current IO of the LUN.

In an embodiment, the virtual machine is associated with a first virtual volume, and a second virtual volume, and the method includes backing up the first virtual volume according to a first backup frequency; and backing up the second virtual volume according to a second backup frequency, different from the first backup frequency. In an embodiment, the virtual machine is associated with a first virtual volume, and a second virtual volume, and the method includes backing up the first virtual volume a first number of times within a time period; and backing up the second virtual volume a second number of times within the time period, wherein the second number of times is different from the first number of times.

In another specific embodiment, there is a system for backing up a virtual volume of a virtual machine, the system comprising: a processor-based system executed on a computer system and configured to: store a plurality of backup policies, each backup policy specifying a backup frequency based on a range of input/output (TO) rates; gather, from a storage array, an identification of a logical unit number (LUN) to which a virtual volume of a virtual machine has been mapped, and an IO rate of the LUN; select a backup policy having a range of IO rates that correspond to the IO rate of the LUN gathered from the storage array; and backup the virtual volume according to a particular backup frequency as specified in the selected backup policy, the backup policy thereby having been selected without querying a host computer hosting the virtual machine, or a virtual machine management center managing the virtual machine.

In another specific embodiment, there is a computer program product, comprising a non-transitory computer-readable medium having a computer-readable program code embodied therein, the computer-readable program code adapted to be executed by one or more processors to implement a method comprising: storing a plurality of backup policies, each backup policy specifying a backup frequency based on a range of input/output (TO) rates; gathering, from a storage array, an identification of a logical unit number (LUN) to which a virtual volume of a virtual machine has been mapped, and an IO rate of the LUN; selecting a backup policy having a range of IO rates that correspond to the IO rate of the LUN gathered from the storage array; and backing up the virtual volume according to a particular backup frequency as specified in the selected backup policy, the backup policy thereby having been selected without querying a host computer hosting the virtual machine, or a virtual machine management center managing the virtual machine.

In a specific embodiment, a method includes storing in an application database information about a plurality of applications, the information comprising a name, version, and backup policy for the application, the backup policy specifying a backup frequency; accessing a storage array in which a virtual volume of a virtual machine has been provisioned; attempting to gather, from the storage array, details about an application on the virtual volume, the details comprising a name, and version of the application on the virtual volume; upon gathering the details, consulting the application database using the gathered name and version of the application on the virtual volume to select a backup policy corresponding to the gathered name and version of the application; and backing up the virtual volume according to a particular backup frequency as specified in the selected backup policy.

The method may include determining that the attempt to gather the details from the storage array was not successful; and after the determining, attempting to gather the details from a virtual machine management center managing the virtual machine. The method may include determining that the attempt to gather the details from the virtual machine management center was not successful; and after the determining that the attempt to gather from the virtual machine management center was not successful, gathering the details from a host computer hosting the virtual machine. In an embodiment, the backup frequency specifies a number of times within a specified time period that backups of the virtual volume should be performed.

In an embodiment, the virtual machine is managed by a virtual machine management center, and the attempting to gather, from the storage array, details about an application on the virtual volume is performed without querying the virtual machine management center, and without querying a host computer hosting the virtual machine.

The method may include storing in a catalog an identifier for the virtual volume, a name of the application on the virtual volume, and a version of the application on the virtual volume; reviewing the application database to determine an application type of the application on the virtual volume; tagging the virtual volume in the catalog with the application type; and allowing a backup application to access the catalog, review the application type of application on the virtual volume, and backup the virtual volume based on the application type, wherein the application type is based on the backup frequency for the application as specified in the application database.

In another specific embodiment, there is a system for backing up a virtual volume of a virtual machine, the system comprising: a processor-based system executed on a computer system and configured to: store in an application database information about a plurality of applications, the information comprising a name, version, and backup policy for the application, the backup policy specifying a backup frequency; access a storage array in which a virtual volume of a virtual machine has been provisioned; attempt to gather, from the storage array, details about an application on the virtual volume, the details comprising a name, and version of the application on the virtual volume; upon gathering the details, consult the application database using the gathered name and version of the application on the virtual volume to select a backup policy corresponding to the gathered name and version of the application; and backup the virtual volume according to a particular backup frequency as specified in the selected backup policy.

In another specific embodiment, there is a computer program product, comprising a non-transitory computer-readable medium having a computer-readable program code embodied therein, the computer-readable program code adapted to be executed by one or more processors to implement a method comprising: storing in an application database information about a plurality of applications, the information comprising a name, version, and backup policy for the application, the backup policy specifying a backup frequency; accessing a storage array in which a virtual volume of a virtual machine has been provisioned; attempting to gather, from the storage array, details about an application on the virtual volume, the details comprising a name, and version of the application on the virtual volume; upon gathering the details, consulting the application database using the gathered name and version of the application on the virtual volume to select a backup policy corresponding to the gathered name and version of the application; and backing up the virtual volume according to a particular backup frequency as specified in the selected backup policy.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:
1. A method comprising:
   storing in an application database information about a plurality of applications, the information comprising a name, version, and backup policy for an application, the backup policy specifying a backup frequency;
   accessing a storage array in which a virtual volume of a virtual machine has been provisioned;

attempting to gather, from the storage array, details about an application on the virtual volume, the details comprising a name, and version of the application on the virtual volume;

upon gathering the details, consulting the application database using the gathered name and version of the application on the virtual volume to select a backup policy corresponding to the gathered name and version of the application;

backing up the virtual volume according to a particular backup frequency as specified in the selected backup policy;

determining that the attempt to gather the details from the storage array was not successful; and after the determining, attempting to gather the details from a virtual machine management center managing the virtual machine.

2. The method of claim 1 comprising:

determining that the attempt to gather the details from the virtual machine management center was not successful; and after the determining that the attempt to gather from the virtual machine management center was not successful, gathering the details from a host computer hosting the virtual machine.

3. The method of claim 1 wherein the backup frequency specifies a number of times within a specified time period that backups of the virtual volume should be performed.

4. A method comprising:

storing in an application database information about a plurality of applications, the information comprising a name, version, and backup policy for an application, the backup policy specifying a backup frequency;

accessing a storage array in which a virtual volume of a virtual machine has been provisioned;

attempting to gather, from the storage array, details about an application on the virtual volume, the details comprising a name, and version of the application on the virtual volume;

upon gathering the details, consulting the application database using the gathered name and version of the application on the virtual volume to select a backup policy corresponding to the gathered name and version of the application; and backing up the virtual volume according to a particular backup frequency as specified in the selected backup policy, wherein the virtual machine is managed by a virtual machine management center, and the attempting to gather, from the storage array, details about an application on the virtual volume is performed without querying the virtual machine management center, and without querying a host computer hosting the virtual machine.

5. A method comprising:

storing in an application database information about a plurality of applications, the information comprising a name, version, and backup policy for an application, the backup policy specifying a backup frequency;

accessing a storage array in which a virtual volume of a virtual machine has been provisioned;

attempting to gather, from the storage array, details about an application on the virtual volume, the details comprising a name, and version of the application on the virtual volume;

upon gathering the details, consulting the application database using the gathered name and version of the application on the virtual volume to select a backup policy corresponding to the gathered name and version of the application;

backing up the virtual volume according to a particular backup frequency as specified in the selected backup policy;

storing in a catalog an identifier for the virtual volume, a name of the application on the virtual volume, and a version of the application on the virtual volume;

reviewing the application database to determine an application type of the application on the virtual volume;

tagging the virtual volume in the catalog with the application type; and allowing a backup application to access the catalog, review the application type of the application on the virtual volume, and backup the virtual volume based on the application type, wherein the application type is based on the backup frequency for the application as specified in the application database.

6. A system for backing up a virtual volume of a virtual machine, the system comprising:

a processor-based system executed on a computer system and configured to:

store in an application database information about a plurality of applications, the information comprising a name, version, and backup policy for an application, the backup policy specifying a backup frequency;

access a storage array in which a virtual volume of a virtual machine has been provisioned;

attempt to gather, from the storage array, details about an application on the virtual volume, the details comprising a name, and version of the application on the virtual volume;

upon gathering the details, consult the application database using the gathered name and version of the application on the virtual volume to select a backup policy corresponding to the gathered name and version of the application;

backup the virtual volume according to a particular backup frequency as specified in the selected backup policy;

determine that the attempt to gather the details from the storage array was not successful; and after the determination, attempt to gather the details from a virtual machine management center managing the virtual machine.

7. The system of claim 6 wherein the processor-based system is configured to:

determine that the attempt to gather the details from the virtual machine management center was not successful; and after the determination that the attempt to gather from the virtual machine management center was not successful, gather the details from a host computer hosting the virtual machine.

8. The system of claim 6 wherein the backup frequency specifies a number of times within a specified time period that backups of the virtual volume should be performed.

9. A system for backing up a virtual volume of a virtual machine, the system comprising:

a processor-based system executed on a computer system and configured to:

store in an application database information about a plurality of applications, the information comprising a name, version, and backup policy for an application, the backup policy specifying a backup frequency;

access a storage array in which a virtual volume of a virtual machine has been provisioned;
attempt to gather, from the storage array, details about an application on the virtual volume, the details comprising a name, and version of the application on the virtual volume;
upon gathering the details, consult the application database using the gathered name and version of the application on the virtual volume to select a backup policy corresponding to the gathered name and version of the application; and
backup the virtual volume according to a particular backup frequency as specified in the selected backup policy, wherein the virtual machine is managed by a virtual machine management center, and the attempt to gather, from the storage array, details about an application on the virtual volume is performed without querying the virtual machine management center, and without querying a host computer hosting the virtual machine.

10. A system for backing up a virtual volume of a virtual machine, the system comprising:
a processor-based system executed on a computer system and configured to:
store in an application database information about a plurality of applications, the information comprising a name, version, and backup policy for an application, the backup policy specifying a backup frequency;
access a storage array in which a virtual volume of a virtual machine has been provisioned;
attempt to gather, from the storage array, details about an application on the virtual volume, the details comprising a name, and version of the application on the virtual volume;
upon gathering the details, consult the application database using the gathered name and version of the application on the virtual volume to select a backup policy corresponding to the gathered name and version of the application;
backup the virtual volume according to a particular backup frequency as specified in the selected backup policy;
store in a catalog an identifier for the virtual volume, a name of the application on the virtual volume, and a version of the application on the virtual volume;
review the application database to determine an application type of the application on the virtual volume;
tag the virtual volume in the catalog with the application type; and
allow a backup application to access the catalog, review the application type of the application on the virtual volume, and backup the virtual volume based on the application type, wherein the application type is based on the backup frequency for the application as specified in the application database.

11. A computer program product, comprising a non-transitory computer-readable medium having a computer-readable program code embodied therein, the computer-readable program code adapted to be executed by one or more processors to implement a method comprising:
storing in an application database information about a plurality of applications, the information comprising a name, version, and backup policy for an application, the backup policy specifying a backup frequency;
accessing a storage array in which a virtual volume of a virtual machine has been provisioned;
attempting to gather, from the storage array, details about an application on the virtual volume, the details comprising a name, and version of the application on the virtual volume;
upon gathering the details, consulting the application database using the gathered name and version of the application on the virtual volume to select a backup policy corresponding to the gathered name and version of the application;
backing up the virtual volume according to a particular backup frequency as specified in the selected backup policy;
determining that the attempt to gather the details from the storage array was not successful; and
after the determining, attempting to gather the details from a virtual machine management center managing the virtual machine.

12. The computer program product of claim 11 wherein the method comprises:
determining that the attempt to gather the details from the virtual machine management center was not successful; and
after the determining that the attempt to gather from the virtual machine management center was not successful, gathering the details from a host computer hosting the virtual machine.

13. The computer program product of claim 11 wherein the backup frequency specifies a number of times within a specified time period that backups of the virtual volume should be performed.

14. A computer program product, comprising a non-transitory computer-readable medium having a computer-readable program code embodied therein, the computer-readable program code adapted to be executed by one or more processors to implement a method comprising:
storing in an application database information about a plurality of applications, the information comprising a name, version, and backup policy for an application, the backup policy specifying a backup frequency;
accessing a storage array in which a virtual volume of a virtual machine has been provisioned;
attempting to gather, from the storage array, details about an application on the virtual volume, the details comprising a name, and version of the application on the virtual volume;
upon gathering the details, consulting the application database using the gathered name and version of the application on the virtual volume to select a backup policy corresponding to the gathered name and version of the application; and
backing up the virtual volume according to a particular backup frequency as specified in the selected backup policy, wherein the virtual machine is managed by a virtual machine management center, and the attempting to gather, from the storage array, details about an application on the virtual volume is performed without querying the virtual machine management center, and without querying a host computer hosting the virtual machine.

15. A computer program product, comprising a non-transitory computer-readable medium having a computer-readable program code embodied therein, the computer-readable program code adapted to be executed by one or more processors to implement a method comprising:
storing in an application database information about a plurality of applications, the information comprising a name, version, and backup policy for an application, the backup policy specifying a backup frequency;

accessing a storage array in which a virtual volume of a virtual machine has been provisioned;

attempting to gather, from the storage array, details about an application on the virtual volume, the details comprising a name, and version of the application on the virtual volume;

upon gathering the details, consulting the application database using the gathered name and version of the application on the virtual volume to select a backup policy corresponding to the gathered name and version of the application;

backing up the virtual volume according to a particular backup frequency as specified in the selected backup policy;

storing in a catalog an identifier for the virtual volume, a name of the application on the virtual volume, and a version of the application on the virtual volume;

reviewing the application database to determine an application type of the application on the virtual volume;

tagging the virtual volume in the catalog with the application type; and allowing a backup application to access the catalog, review the application type of the application on the virtual volume, and backup the virtual volume based on the application type, wherein the application type is based on the backup frequency for the application as specified in the application database.

* * * * *